United States Patent
Nomura

(10) Patent No.: US 6,773,057 B2
(45) Date of Patent: Aug. 10, 2004

(54) FRONT STRUCTURE OF VEHICLE

(75) Inventor: Akira Nomura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/664,441

(22) Filed: Sep. 18, 2003

(65) Prior Publication Data

US 2004/0056515 A1 Mar. 25, 2004

(30) Foreign Application Priority Data

Sep. 18, 2002 (JP) ........................................ 2002-272014

(51) Int. Cl.[7] .............................................. B62D 25/08
(52) U.S. Cl. .................... 296/198; 296/203.02; 296/30; 296/204; 280/788
(58) Field of Search ........................... 296/198, 203.02, 296/30, 187.08, 187.09, 203.03, 204; 280/788, 124.155, 124.147

(56) References Cited

U.S. PATENT DOCUMENTS 4,909,565 A * 3/1990 Harasaki et al. ....... 296/187.09
5,411,311 A * 5/1995 Shimmell et al. ...... 296/203.02
6,648,401 B2 * 11/2003 Behnke et al. .............. 296/198

FOREIGN PATENT DOCUMENTS

| JP | 3-239613 | * 10/1991 |
| JP | 10129523 A | 5/1998 |

* cited by examiner

Primary Examiner—Joseph D. Pape
(74) Attorney, Agent, or Firm—Smith, Gambrell & Russell, LLP

(57) ABSTRACT

A front structure of a vehicle includes a suspension cross member provided between left and right front side frames; wheel aprons, each provided between an upper side frame and the front side frame; and strut towers connected to the upper side frames, front side frames and wheel aprons. A pair of strut tower reinforcing members form vertically extending structures with closed hollow cross sections in cooperation with the strut towers. The structures with the closed cross hollow cross sections are arranged to correspond to ends of the suspension cross member with respect to a longitudinal direction of the vehicle.

9 Claims, 8 Drawing Sheets

FRONT STRUCTURE OF VEHICLE

BACKGROUND OF THE INVENTION

1. Field of the Invention

The present invention relates to a front structure of a vehicle, more specifically to a front structure of a vehicle for decreasing weight of a vehicle body with maintaining rigidity.

2. Discussion of the Related Art

A front structure of a vehicle contains left and right wheel aprons constituting left and right lateral walls of an engine compartment. Each of the wheel aprons extends approximately from a front end of the vehicle to a toe board in a lengthwise direction of the vehicle. The upper and lower ends of the wheel aprons are respectively connected to upper side frames and front side frames. Each wheel apron has a wheel arch protruding toward the engine compartment for accommodating a wheel therein. A suspension strut is accommodating in the wheel arch, and a strut tower for supporting a top end of the suspension strut is provided on the wheel arch. A suspension cross member is provided between the left and right front side frames. The suspension cross member supports lower ends of suspension lower arms and power units such as an engine and a transmission. A strut tower should have a relatively high rigidity to sufficiently support a load applied from a suspension or the like. Japanese Kokai Publication 10 (1998)-129523 may be briefly summarized as follows. FIG. 8 is a schematic cross sectional view of a strut tower structure. In the figure, an arrow F denotes a front direction of a vehicle.

A strut tower 102 is supported on a wheel apron 101 and has a lower end connected to a front side frame 103 and an upper end connected to an upper side frame 105. Strut tower reinforcing members 104 are provided at front and rear ends of the strut tower 102 in an approximately vertical direction. Namely, the reinforcing members 104 extend so as to cover the front and rear ends of the strut tower 102 along the convex shape of the wheel apron 101. The lower end of the strut tower reinforcing member 104 is connected to the front side frame 103 and the upper end thereof is connected to the upper side frame 105. By this configuration, the strut tower 102 can be firmly (rigidly) supported, so as to provide a rigid structure.

A load can be applied to the suspension cross member through the suspension and the power units and then transmitted to the left and right front side frames. Therefore, even if the rigidity itself is sufficient, it is also necessary to increase the connection strength of the suspension cross member and the front side frames. For this purpose, reinforcing members are applied to the connection parts between the suspension cross member and the front side frames, or the front side frames themselves are strengthened. Accordingly, it is possible that the weight of the vehicle is increased or that the structure becomes complicated.

Various loads can be applied to a vehicle body in many situations when the vehicle moves. Thus, a sufficient rigidity is required, especially to the front structure of the vehicle.

OBJECT AND SUMMARY OF THE INVENTION

It is therefore a first object of the present invention to provide a front structure of a vehicle having an excellent rigidity in spite of its lightweight by eliminating additional reinforcing members and excluding a complex structure.

The first object of the present invention is achieved by a front structure of a vehicle, comprising a pair of symmetrically formed units, each comprising an upper side frame extending in a lengthwise direction of the vehicle; a front side frame extending in a lengthwise direction of the vehicle at a lower and inner position with respect to the upper side frame; a wheel apron extending in a lengthwise direction of the vehicle to provide a lateral wall of an engine compartment of the vehicle, an upper end and a lower end of the wheel apron being respectively connected to the upper side frame and the front side frame; a strut tower provided between the upper side frame and the front side frame and connected to the wheel apron; and a strut tower reinforcing member connecting the upper side frame and the front side frame, the strut tower reinforcing member forming a structure having a closed hollow cross section extending approximately in a vertical direction in cooperation with the strut tower; and a suspension cross member extending in a widthwise direction of the vehicle, the suspension cross member connecting the front side frame in each of the units to each other, the suspension cross member positioned in a lengthwise direction of the vehicle corresponding to a lower end of the structure having a closed hollow cross section in each of the units.

The first object the present invention is also be achieved by a front structure of a vehicle comprising a pair of symmetrically formed units, each comprising an upper side frame extending in a lengthwise direction of the vehicle; a front side frame extending in a lengthwise direction of the vehicle provided at a lower and inner position with respect to the upper side frame; a wheel apron extending in a lengthwise direction of the vehicle to provide a lateral wall of an engine compartment of the vehicle, an upper end and a lower end of the wheel apron being respectively connected to the upper side frame and the front side frame;

strut tower provided between the upper side frame and the front side frame and connected to the wheel apron; and a strut tower reinforcing member connecting the upper side frame and the front side frame, the strut tower reinforcing member forming a structure having a closed hollow cross section extending approximately in a vertical direction along the strut tower in cooperation with the wheel apron; and a suspension cross member extending in a widthwise direction of the vehicle, the suspension cross member connecting the front side frame in each of the units to each other, the suspension cross member positioned in a lengthwise direction of the vehicle corresponding to a lower end of the structure having a closed hollow cross section in each of the units.

A second object of the present invention is to provide the front structure of a vehicle wherein the rigidity of the structure having the closed hollow cross section, strut tower and the vehicle body is further improved by connecting a lateral end of the strut tower to a lateral end of the strut tower reinforcing member and to a lateral end of the wheel apron.

A third object of the present invention is to provide the front structure of a vehicle wherein the connection rigidity of the strut tower and the suspension cross member is further improved, which in turn increases the rigidity of the vehicle body by connect, a lower edge of the strut tower reinforcing member to the suspension cross member.

A fourth object of the present invention is to provide the front structure of the vehicle wherein the rigidity of the entire front structure of the vehicle is improved by further comprising a strut tower bar for connecting the strut tower in each of the units to each other.

A fifth object of the present invention is to provide the front structure of the vehicle wherein the strut towers are stably supported which increases the rigidity of the vehicle body by connecting the strut tower bar to the strut tower and to the upper side frame at a location with respect to a lengthwise direction of the vehicle corresponding to the structure having a closed hollow cross section.

A sixth object of the present invention is to provide the front structure of the vehicle wherein the strut towers are stably supported and the rigidity of the entire front structure of the vehicle is further improved, by further comprising a strut tower bar for connecting the strut tower in each of the units to each other, each free end of the strut tower bar having a first installation part and a second installation part, the first installation part being connected to the upper side frame, the second installation part being connected to an upper face of the strut tower, the strut tower bar positioned in a lengthwise direction of the vehicle corresponding to a closed hollow cross section.

BRIEF DESCRIPTION OF THE DRAWINGS

A more complete appreciation of the invention and many of the attendant advantages thereof will be readily perceived as the same becomes better understood by reference to the following detailed description when considered in connection with the accompanying drawings wherein.

DETAILED DESCRIPTION OF THE INVENTION

Other features of the present invention will become understood from the following description of exemplary embodiments, which are given for illustration of the present invention and are not intended to be limiting thereof.
(First Embodiment)

A front structure of a vehicle according to the present invention as a first embodiment will be described by referring to FIGS. 1 to 5.

Figure 1:
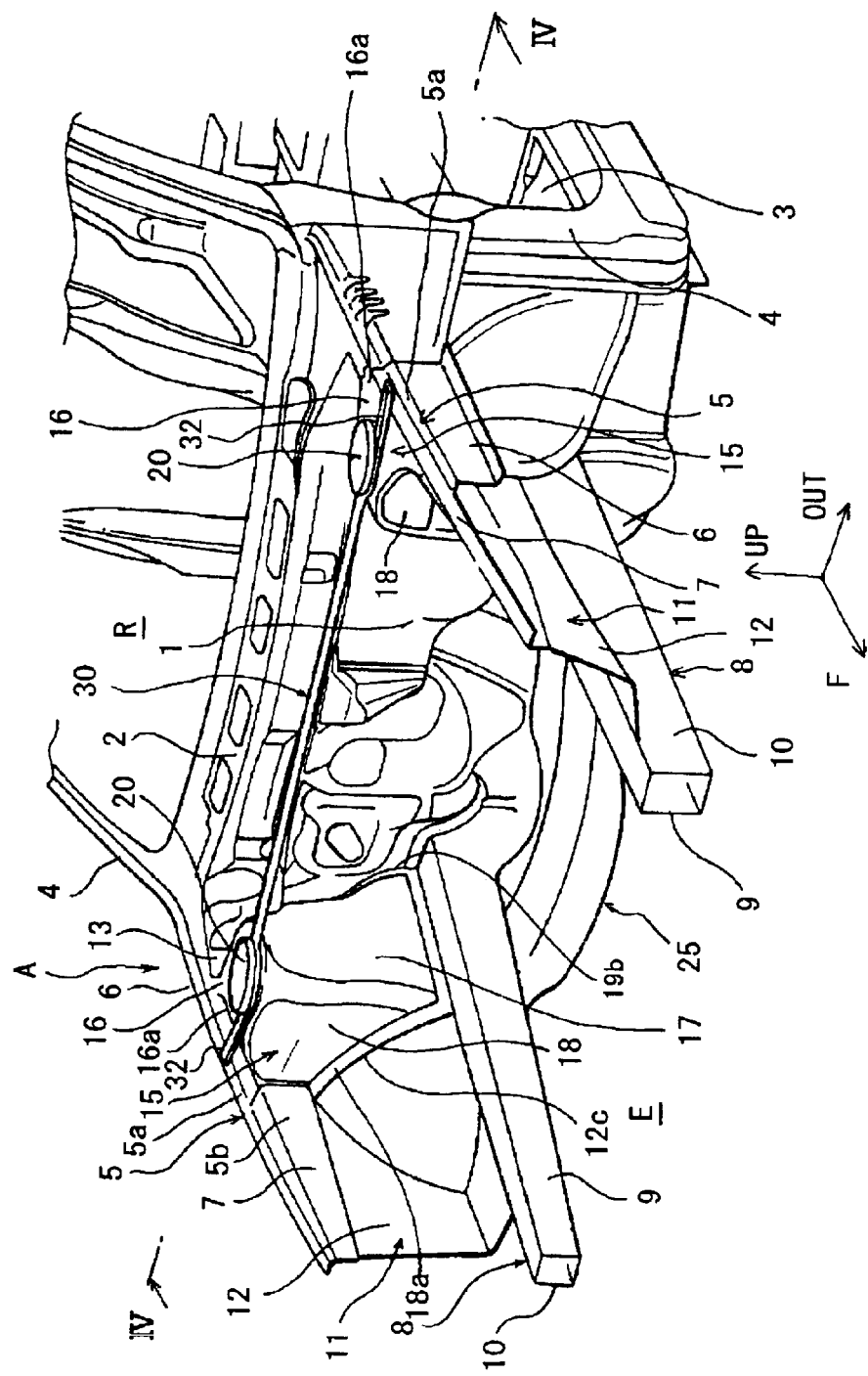
FIG. 1 is a partial perspective view of a front structure of a vehicle as a first embodiment according to the present invention.
Figure 2:
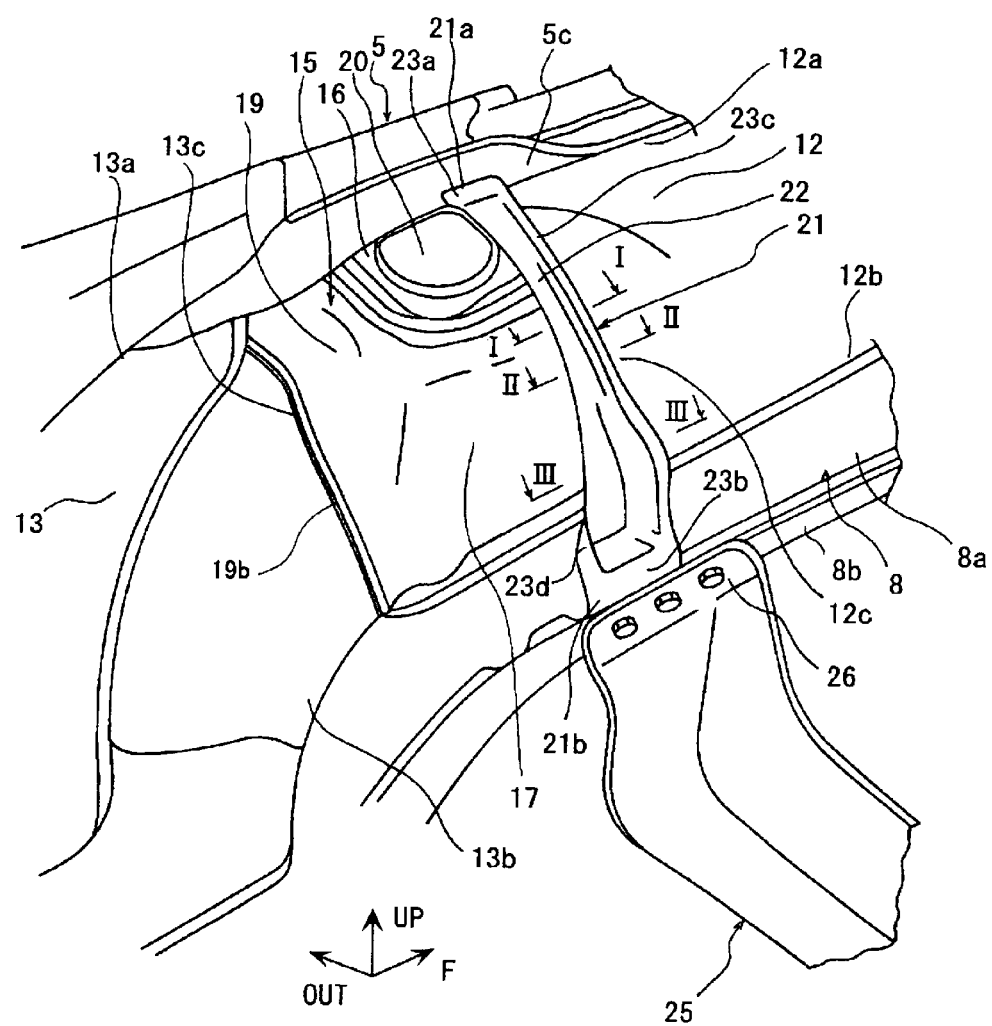
FIG. 2 is an enlarged partial perspective view of the front structure of the vehicle seen from a bottom as the first embodiment according to the present invention.

FIG. 1 is a partial perspective view of a front structure of a vehicle seen from an upper position, and FIG. 2 is an enlarged partial perspective view seen from the bottom of the front structure of the vehicle. In the figures, arrows F, OUT, UP respectively denote a front direction, an outer direction with respect to a vehicle width, and an upper direction.

As shown in FIG. 1, a front structure includes a toe board 1 partitioning a passenger compartment R and an engine compartment E. An upper end of the toe board 1 is connected to a bulkhead 2, and a lower end of the toe board 1 is connected to a front edge of a floor 3. Lateral edges of the toe board 1 and the bulkhead 2 are connected to left and right front pillars 4 extending in a vertical direction.

In front of each front pillar 4, an upper side frame 5 is formed as a rectangular closed hollow cross section by an upper outer panel 6 and an upper inner panel 7. Owing to the structure, the upper side frame 5 has a sufficient rigidity. The upper side frames 5 extend in a lengthwise direction of the vehicle along left and right upper edges of the engine compartment E. Rear ends of the upper side frames 5 abut against front faces of the front pillars 4, and connected thereto.

On the other hand, front side frames 8 having a sufficient rigidity extend in a lengthwise direction of the vehicle along left and right lower edges of the engine compartment E. Each front side frame 8 also has a rectangular closed hollow cross section formed by a lower inner panel 9 approximately having a U shaped cross section and a lower outer panel 10 approximately having a plane cross section. The front side frames 8 abut against the toe board 1 and connected thereto. The lower inner panels 9 of the front side frames 8 further extend by bending via a bottom edge of the toe board 1 to a bottom face of the floor 3, and connected to the bottom face.

Wheel aprons 11 including front wheel aprons 12 and rear wheel aprons 13 are provided between the upper side frames 5 and the front side frames 8. The wheel aprons 11 serve as lateral walls of the engine compartment E. Each front wheel apron 12 forms a front region of a wheel arch. An upper end 12a of the front wheel apron 12 is connected to the upper side frame 5, and a lower end 12b thereof is connected to the front side frame 8. Furthermore, the rear part of the front wheel apron 12 forms a rear region of the wheel arch protruding toward the engine compartment E.

As shown in FIG. 2, an upper end 13a and a lower end 13b of the rear wheel apron 13 are respectively connected to the upper side frame 5 and the front side frame 8. A rear end of the rear wheel apron 13 is connected to the toe board 1, the bulkhead 2 and the front pillar 4 (FIG. 1). A front part of the rear wheel apron 13 forms a rear region of the wheel arch protruding toward the engine compartment E. A front end 13c of the rear wheel apron 13 has approximately the same circular arc as that of a rear end 12a of the front wheel apron 12. The front end 13c of the rear wheel apron 13 is spaced apart from the rear end 12a of the front wheel apron 12, although rear wheel apron 13 and the front wheel apron 12 will form a part of a hemisphere if the front end 13c and the rear end 12 are connected to each other. The front and rear wheel aprons 12 and 13 form symmetrically protruding arches.

As shown in FIGS. 1 and 2, a strut tower 15 for accommodating a strut therein protrudes into the engine compartment E, which is provided between a rear end 12c of the front wheel apron 12 and the front end 13c of the rear wheel apron 13. The upper and lower ends of the strut tower 15 are respectively connected to the upper side frame 5 and the front side frame 8.

The strut tower 15 is approximately in the shape of an inversed bucket, and composed of an upper wall 16, an inner wall 17, a front wall 18, and a rear wall 19. The inner wall 17, the front wall 18 and the rear wall 19 downwardly extend from an inner edge, a front edge and a rear edge of the upper wall 16, respectively. Further, an outer edge of the upper wall 16 is connected to an upper face 5a of the upper side frame 5. There is a strut mount installing hole 20 at the center of the upper wall 16, for installing a strut mount unit (not shown) which in turn supports a top end of a strut. A front flange 18b is formed on an outer edge 18a of the front wall 18. The front flange 18b extends from an inner wall 5b of the upper side frame 5 along the rear end 12c of the front wheel apron 12. The front flange 18b is superimposed with the rear end 12c and fixed thereto. A rear flange 19b is formed along the outer edge of the rear wall 19, extending from the inner wall 5b of the upper side frame 5. The rear flange 19b is also superimposed with the outer edge of the rear wall 19 and fixed thereto.

FIG. 2 shows a strut tower reinforcing member 21 provided between the upper side frame 5 and the front side frame 8 on the back side of the strut tower 15. The strut tower reinforcing member 21 is in the form of arc bent approximately along the front edge of the strut tower 15. An upper end 21a of the strut tower reinforcing member 21 is connected to the upper side frame 5 and a lower end 21b thereof is connected to the front side frame 8. In other words, the strut tower reinforcing member 21 extends in an approximately vertical direction on a back-bottom side of the strut tower along the front wall 18.

Figure 3A:
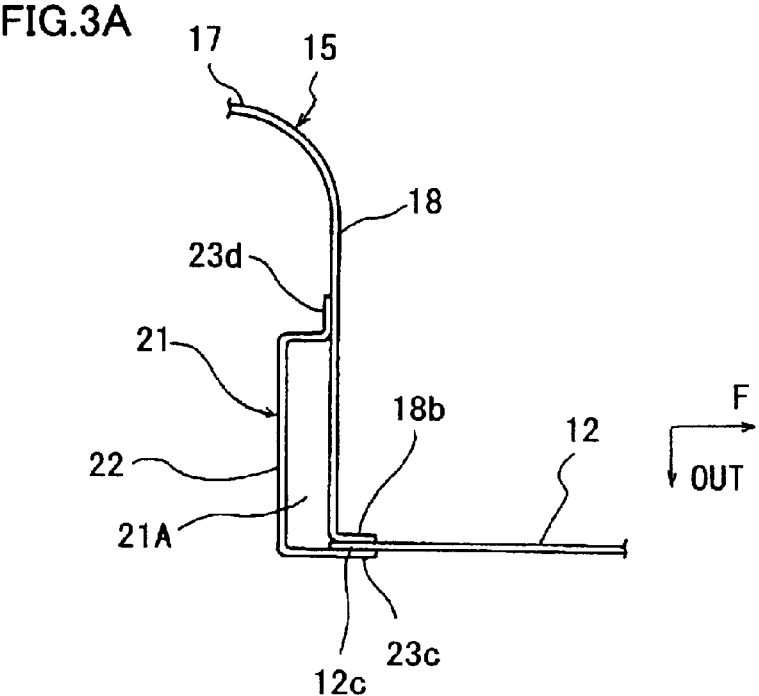
FIG. 3A is a cross section of a part of the front structure of the vehicle shown in FIG. 2 cut along a line I—I.
Figure 3B:
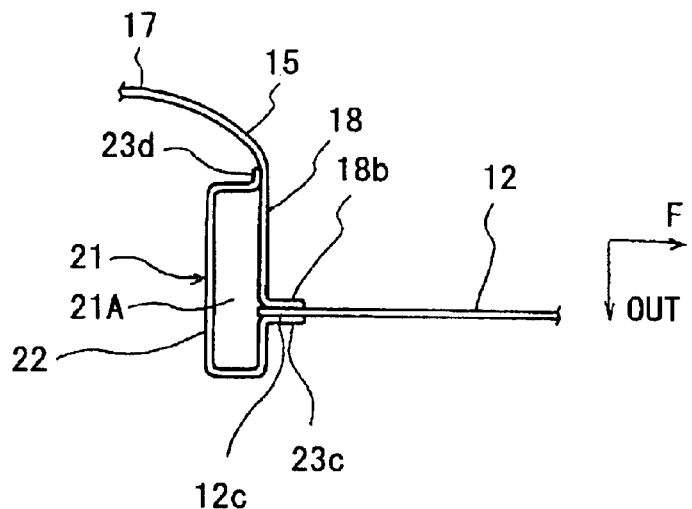
FIG. 3B is a cross section of a part shown in FIG. 2 cut along a line II—II.
Figure 3C:
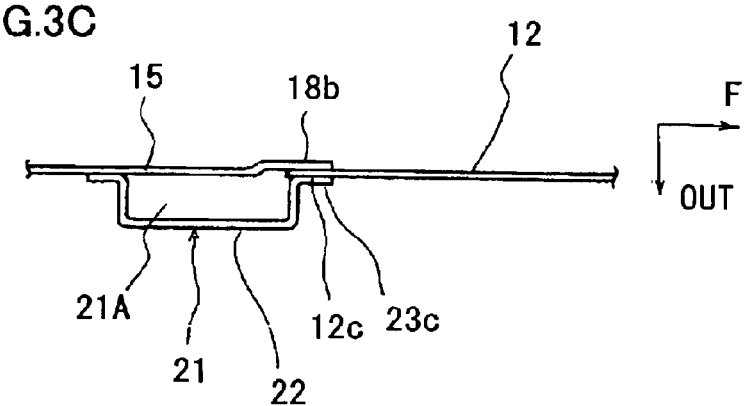
FIG. 3C is a cross section of a part shown in FIG. 2 cut along a line III—III.

The structure of the strut tower reinforcing member 21 will now be explained more in detail with reference to FIG. 2 and FIGS. 3A to 3C. FIGS. 3A, 3B and 3C are cross sections obtained by cutting the front structure of the vehicle in FIG. 2 along lines I—I, II—II and III—III in FIG. 1, respectively, and seen in the direction of arrows. A main body 22 of the strut tower reinforcing member 21 extends from a lower face 5c of the upper side frame 5 to an outer face 8a of the front side frame 8 through the front edge of the upper wall 16 and the front wall 18. The main body 22 is placed inside the strut tower 15, that is, on an opposite side of the engine compartment E. The main body 22 rises in the range of the lower face 5c of the upper side frame 5a to a part near the outer face 8a of the front side frame 8. The strut tower reinforcing member 21 forms a structure with a closed hollow cross section 21A in cooperation with the upper side frame 5, the upper wall 16 of the strut tower 15, the front wall 18 thereof, and the front side frame 8. The shape of the cross section changes from the lower face 5c of the upper side frame to the outer face 8a of the front side frame 8. FIGS. 3A to 3C show the cross sections at an upper part, a middle part, and a lower part of the structure, respectively.

An upper flange 23a and a lower flange 23b each in a rectangular shape are respectively formed on the upper edge and the lower edge of the main body 22. The upper flange 23a is fixed to a lower face 5c of the upper side frame 5, and the lower flange 23b is fixed to the outer face 8a of the front side frame 8 along the bottom edge. The rectangular upper and lower flanges 23a and 23b extend in the lengthwise direction of the lower face 5c of the upper side frame 5 and the outer face 8a of the front side frame 8, respectively.

A front flange 23c is formed along a front edge of the main body 22, extending from a front edge of the upper flange 23a to a front edge of the lower flange 23b. The front flange 23c downwardly extends from the lower face 5c of the upper side frame 5 to the outer face 8a of the front side frame 8 along the rear end 12c of the front wheel apron 12 (FIG. 1). The front flange 23c (lateral end) is connected to both the rear end 12c (lateral wall) of the front wheel apron 12 and the flange 18b (lateral wall formed by bending) of the front wall 18. Here, the front flange 23c, rear edge 12c and flange 18b form a vertically extending superimposed structure having a large rigidity.

Furthermore, a rear flange 23d is formed by bending on the rear edge of the main body 22. The rear flange 23d is extended from a rear edge of the upper flange 23a to a rear edge of the lower flange 23b. The rear flange 23d downwardly extends from the lower face 5c of the upper side frame 5 to the outer face 8a of the front side frame 8 along the lower face of the upper wall 16 of the strut tower 15 and the front wall 18. The rear flange 23d is connected to the lower face 5c of the upper side frame 5, the upper wall 16 of the strut tower 15 and the outer face 18 of the front side frame 8.

The strut tower reinforcing member 21 structured in this way forms a structure having a closed hollow cross section 21A along the front edge of the strut tower 15 from the lower face 5c of the upper side frame 6 to the outer face 8a of the front side flame 8. By the structure 21A, the rigidity of the strut tower 15 is increased, and the upper side frame 5 and the front side frame 8 are strongly connected to each other. Moreover, the aforementioned superimposed structure made by the strut tower 15, and the front flange 23c of the strut tower reinforcing member 21 and the rear end 12c of the front wheel apron 12 also increases the rigidity of the strut tower 15. Hence, the strength of members around the strut tower 15 is also increased.

A suspension cross member 25 is provided to connect the left and right front side frames 8. The suspension cross member 25 extends in a vehicle width direction and has a closed hollow cross section with a sufficient rigidity. Left and right parts of the suspension cross member 25 rise up, and left and right ends thereof are configured as installation parts 26. Each of the installation parts 26 of the suspension cross member 25 is fixed to a lower face 8b of the front side frame 8 by bolts or the like. The location of the installation parts 26 with respect to the lengthwise direction of the vehicle is at least approximately corresponding to the connection parts of the front side frames 8 with the lower ends 21b of the strut tower reinforcing members 21.

By the above-mentioned installation, the lower ends of the structure having the closed hollow cross sections 21A, and the rigid suspension cross member 25 also having a closed hollow cross section are placed approximately side by side. In this configuration, the suspension cross member 25 is rigidly connected with the strut tower reinforcing members 21. Accordingly, the supporting rigidity of the strut tower 15 and suspension cross member 25 for supporting suspensions and a power unit are increased.

Figure 4:
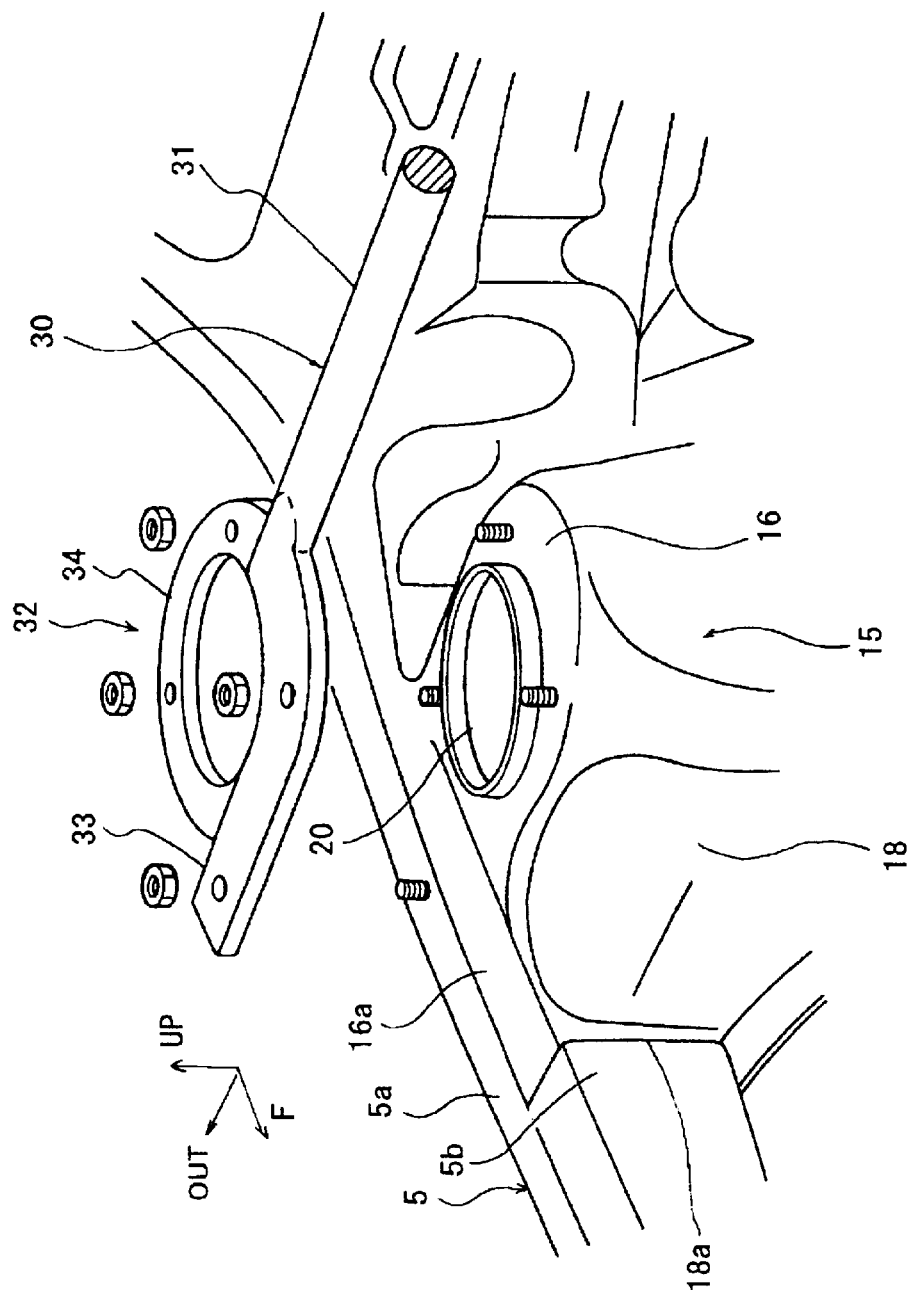
FIG. 4 is an enlarged exploded perspective view of a part A of the front structure of the vehicle shown in FIG. 1.

FIG. 4 is an enlarged exploded perspective view of a part A of the front structure shown in FIG. 1. A strut tower bar 30 links the upper parts of the left and right strut towers 15 to each other. The strut tower bar 30 prevents the strut towers 15 from inwardly inclining, or the vehicle body from twisting. The strut tower bar 30 is composed of a strut tower bar main body 31 extending in a widthwise direction of the vehicle, and installation parts 32 provided at both ends of the strut tower bar main body 31. The installation parts 32 are connected to the top of the strut towers 15, and each of the installation parts 32 has a first part 33 and a second part 34. The first part 33 extends from the strut tower bar main body 31 forming a curved shape along a frontal outer periphery of the strut mount installing hole 20, and a free end of the first part 33 reaches the upper face 5a of the upper side frame 5. On the other hand, the second part 34 in the form of a ring is provided along the entire periphery of the strut mount installing hole 20 and is connected to a lower face of the first part 33. The first parts 22 on both the ends of the strut tower bar main body 22 are fastened by bolts to the upper faces 5a of the left and right upper side frames 5. Each of the first parts 22 is positioned, with respect to the vehicle width, at least approximately corresponding to a connection part of the strut tower reinforcing member 21 with the upper side frame 5. In addition, the second parts 34 are fastened to the upper walls 16 of the strut towers 15 by bolts. Thus, the strut tower bar 30 is installed.

Accordingly, an upper part of the structure with the closed cross sections 21A is connected with the strut tower bar 30 via the upper walls 16 of the strut towers 15. Furthermore, the upper side frames 5 are rigidly connected with the strut tower bar 30. As a result, the upper parts of the strut towers 21 are firmly connected by the strut tower bar 30.

Figure 5:
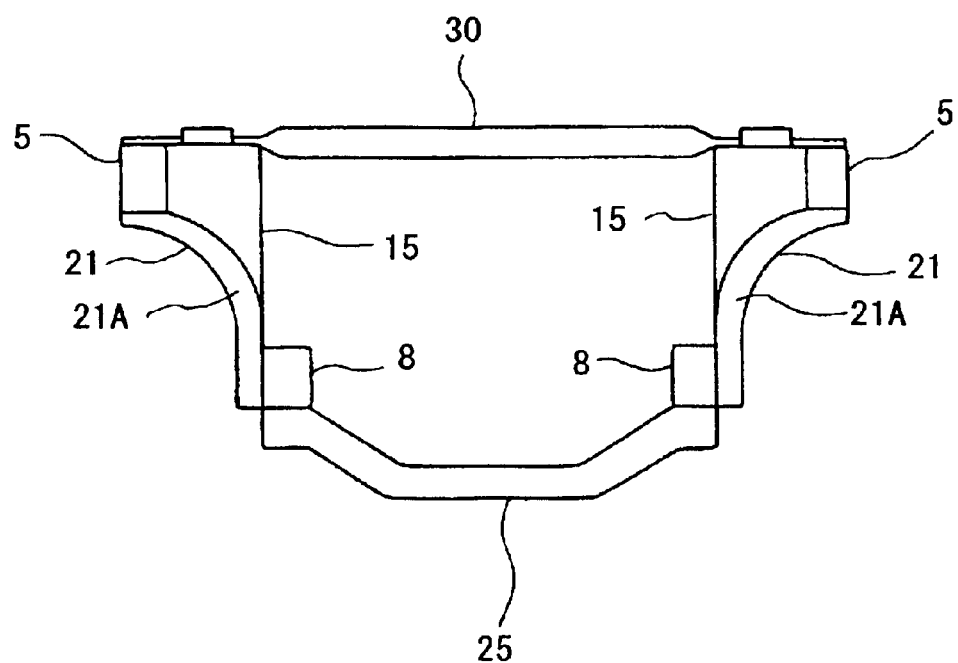
FIG. 5 is a schematic cross section of a part of the front structure of the vehicle in FIG. 1 cut along a line IV—IV.

FIG. 5 is a schematic cross section of a part in FIG. 1 cut along a line IV—IV, which shows the above-mentioned structure. The reinforcing members 21, the left and right structures with the closed cross sections 21A, the suspension cross member 25, and the strut tower bar 30 are successively connected to form a ring (circular) shape, so that the front part of the vehicle having an improved rigidity can be obtained. The ring shaped structure is provided in the vicinity of suspensions and a power unit.

By the above configuration, additional reinforcing members for maintaining rigidity of the vehicle can be omitted. Furthermore, it is not necessary to stiffen front side frames or the like. Therefore, additional stiffening operation, weight increase of the vehicle, or a complex structure can be avoided. Accordingly, a front structure having a sufficient rigidity can be obtained with simultaneously decreasing the weight of the vehicle.

It is particularly important that the rigid structure having the closed cross section 21A and the suspension cross member 25 are positioned via the front side frame 8 so as to correspond to each other in a lengthwise direction of the vehicle. By this arrangement, the connection rigidity of the suspension cross member 25 with the strut tower 21 is improved. Load applied to the suspension cross member 25 through a suspension or a power unit, or load applied to the top of the strut tower 15 from the suspension is effectively dispersed to the entire vehicle body by way of the front side frames 8, the strut towers 15, the upper side frames 5, the strut tower bar 30 or the like. Rigidity improvement of the front structure of the vehicle eliminates vibration and noise of a vehicle especially when driving on a rough road. Moreover, the traveling stability of the vehicle is improved.

When an impact load is applied from lateral sides of the vehicle, the load is effectively dispersed to the entire body of the vehicle through the front side frames 8, the upper side frames 5, the strut towers 15, the strut tower bar 30 and the like which are connected each other to have a ring shape with connection rigidity.

In the above embodiment, the lower ends 21b of the strut tower reinforcing members 21 and the ends of the suspension cross member 25 are connected with each other via the front side frames 8. However, it is possible to further increase the connection rigidity of the strut towers 15 with the suspension cross member 25 by directly connecting the lower ends 21 of the strut tower reinforcing members 21 and the ends of the suspension cross member 25 with each other.

(Second Embodiment)

Figure 6:
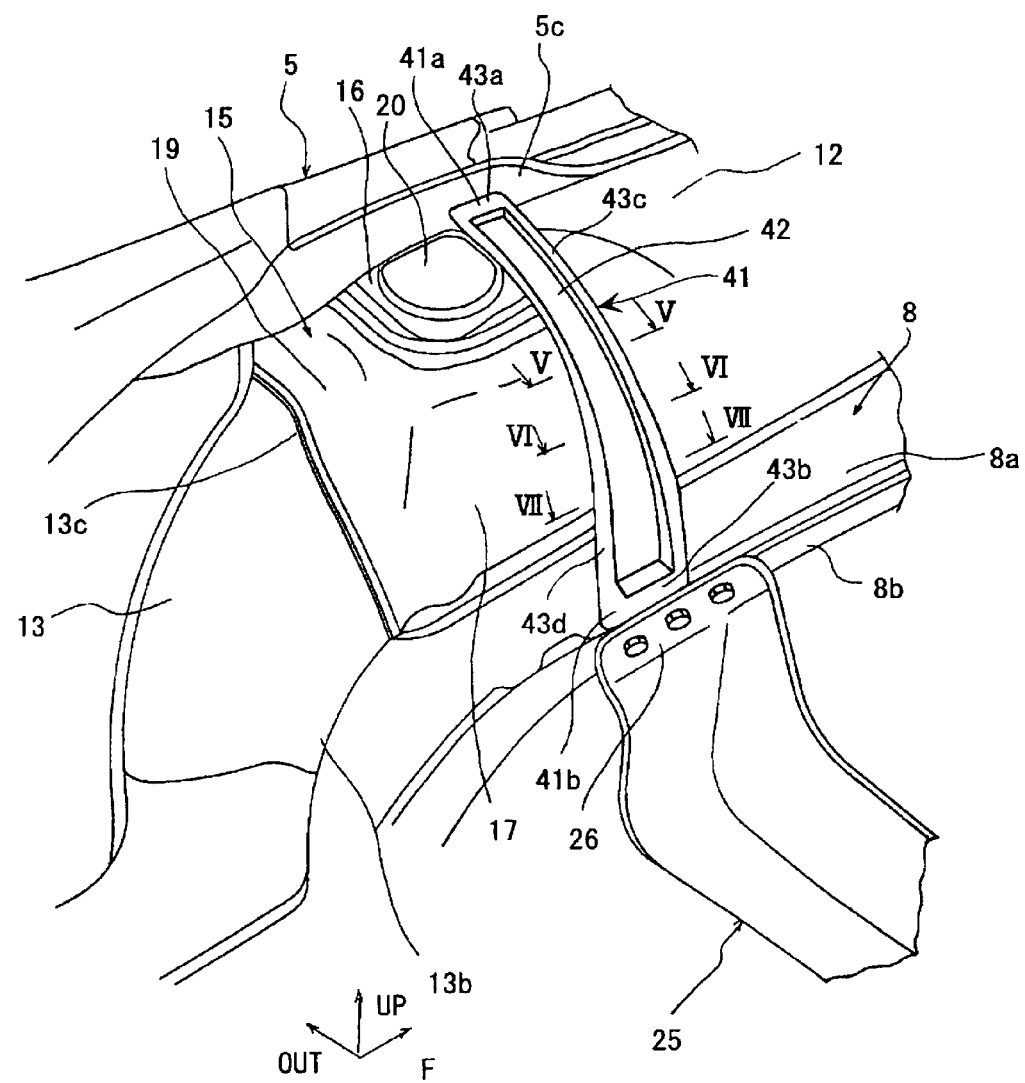
FIG. 6 is an enlarged partial perspective view seen from the bottom of a front structure of a vehicle as a second embodiment according to the present invention.
Figure 7A:
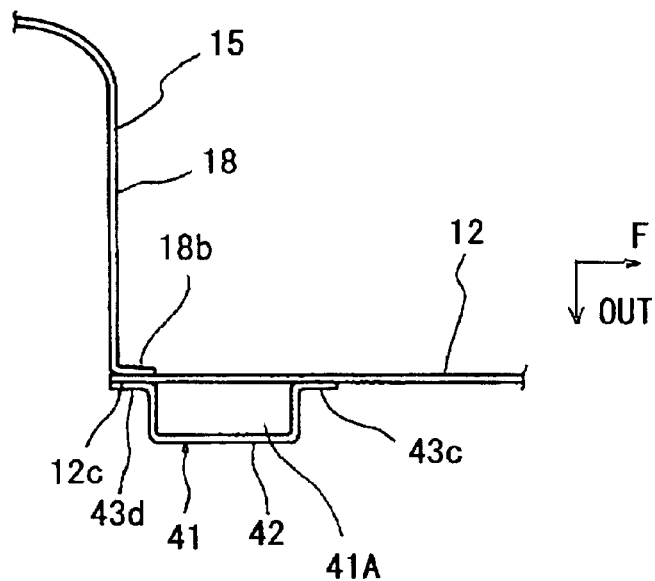
FIG. 7A is a cross section of a part of the front structure shown in FIG. 6 cut along a line V—V.
Figure 7B:
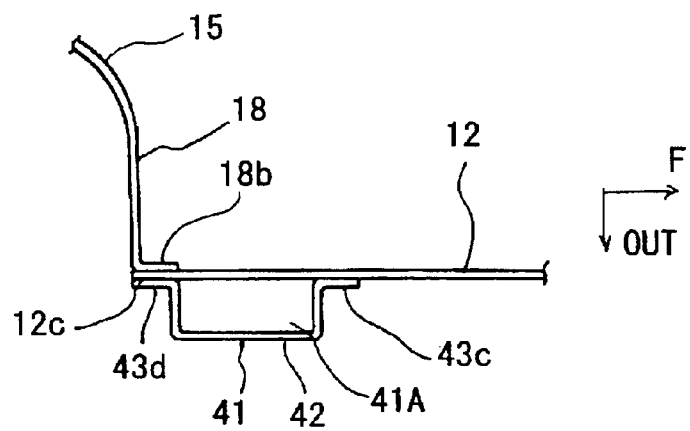
FIG. 7B is a cross section of a part shown in FIG. 6 cut along a line VI—VI.
Figure 7C:
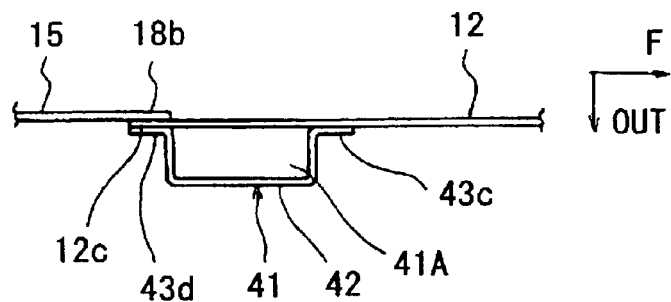
FIG. 7C is a cross section of a part shown in FIG. 6 cut along a line VII—VII.
Figure 8:
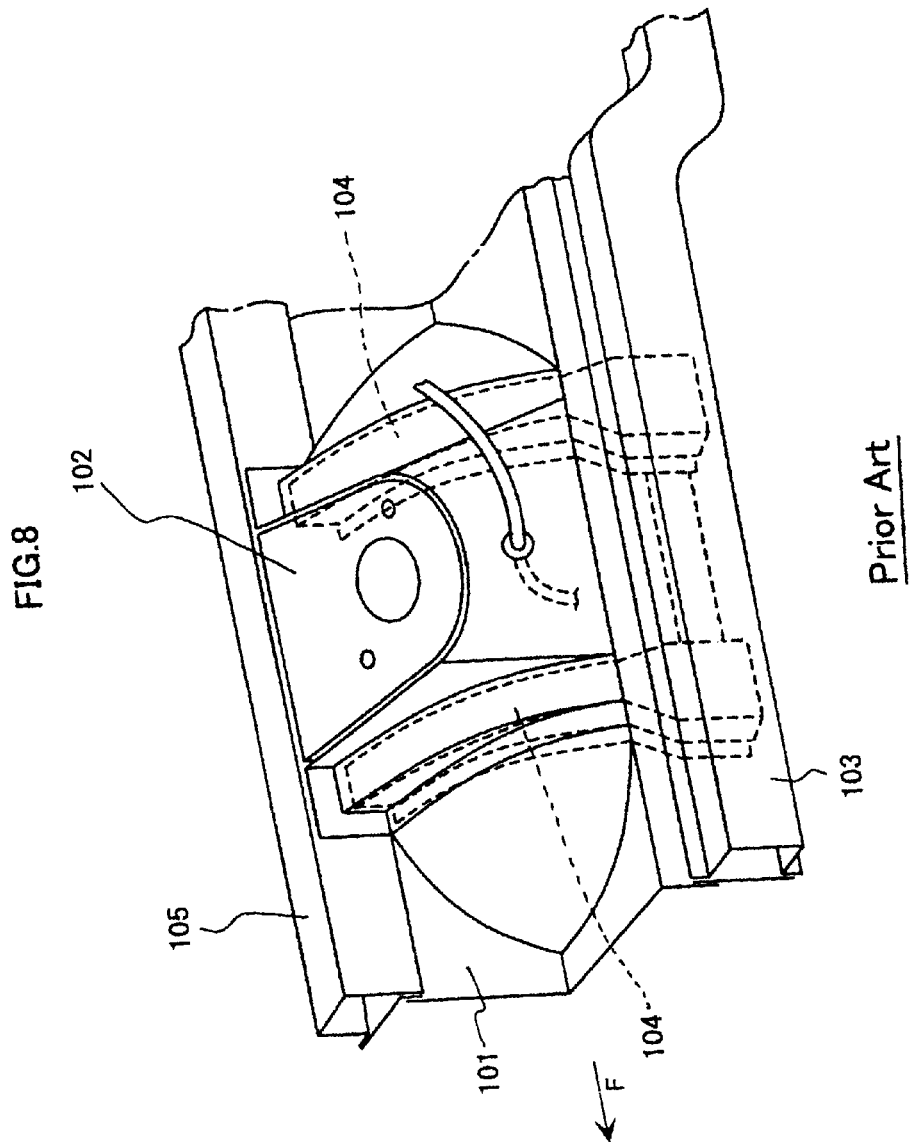
FIG. 8 is a partial cross section of a conventional front structure of a vehicle.

A second embodiment of the front structure of the vehicle according to the present invention will now be explained by referring to FIGS. 6 and 7A to 7C. FIG. 6 is an enlarged partial perspective view of a front structure of a vehicle seen from the bottom and FIGS. 7A to 7C are cross sections of parts shown in FIG. 6 cut along lines V—V, VI—VI and VII—VII, respectively.

The second embodiment has the same structure as that in the first embodiment except that strut tower reinforcing members are provided to parts beside the strut towers. Members in FIGS. 6 and 7A to 7C corresponding to those in FIGS. 1 to 5 are shown by the identical reference numerals as those in FIGS. 1 to 5, and the different parts will be mainly explained.

As explained relating to the first embodiment, the strut tower 15 is placed so as to connect the rear end 12c of the front wheel apron 12 with the front end 13c of the rear wheel apron 13 in the lengthwise direction of the vehicle, and to connect the upper side frame 5 with the front side frame 8 in the widthwise direction of the vehicle.

As shown in FIG. 6, a strut tower reinforcing member 41 extends along the front edge of the strut tower 15 in an approximately vertical direction. An upper edge 41a and a lower edge 41b of the strut tower reinforcing member 41 are respectively connected to the upper side frame 5 and the front side frame 8.

The strut tower reinforcing member 41 has a main body 42 extending from the lower face 5c of the upper side frame 5 to a part near the lower edge on the outer face 8a of the front side frame 8 along the rear edge of the front wheel apron 12. A structure with a closed hollow cross section 41A is formed by cooperation of the strut tower reinforcing member 41, the upper side frame 5, the front wheel apron 12 and the front side frame 8. The main body 42 rises in the range of the lower face 5c of the upper side frame 5a to a part near the outer face 8a of the front side frame 8.

An upper flange 43a and a lower flange 43b are respectively formed on the upper edge and the lower edge of the main body 42. The upper flange 43a is fixed on a lower face 5c of the upper side frame 5, and the lower flange 43b is fixed to the outer face 8a of the front side frame 8 along the bottom edge. The upper and lower flanges 43a and 43b extend in the lengthwise direction of the lower face 5c of the upper side frame 5 and the outer face 8a of the front side frame 8, respectively.

A front flange 43c is formed along the front edge of the main body 42, extending from the front edge of the upper flange 43a to a front end of the lower flange 43b. The front flange 43c downwardly extend from the lower face 5c of the upper side frame 5 to the outer face 8a of the front side frame 8 along the front wheel apron 11. The front flange 43c is connected to the front wheel apron 12, upper side frame 5 and the front side frame 8.

Furthermore, a rear flange 43d is formed on the rear edge of the main body 42. The rear flange 43d is extended from a rear edge of the upper flange 43a to a rear edge of the lower flange 43b. The rear flange 43d downwardly extends from the lower face 5c of the upper side frame 5 to outer face 8a of the front side frame 8 along the flange 18b of the front wall 18. The upper side and the lower side of the rear flange 43d are respectively connected to the lower face 5c of the upper side frame 5 and the outer face 18 of the front side frame 8. Furthermore, the rear flange 43d (a lateral end) is superimposed on the rear end 12c (lateral end) of the front wheel apron 12 and the flange 18b (a lateral end formed by bending) of the front wall 18 of the strut tower 15, as shown in FIGS. 7A to 7C. Here, the rear flange 43d, the rear end 12c and the flange 18b form a vertically extending superimposed structure with a large rigidity.

The strut tower reinforcing member 41 forms the structure with the closed hollow cross section 41A along the front wall 18 of the strut tower 15 by cooperation of the upper side frame 5, the front wheel apron 12 and the front side frame 8. The structure with the closed hollow cross section 41A and the aforementioned vertically extending superimposed structure increases the rigidity of the strut tower 15, and of members provided in the vicinity of the strut tower 15.

The suspension cross member 25 is provided to connect the left and right front side frames 8 to each other. Each end of the suspension cross member is configured as the installation part 26 which is fixed to the lower face 8b of the front side frame 8. The location of the installation parts 26 with respect to the lengthwise direction of the vehicle is at least approximately corresponding to the connection parts of the front side frames 8 with the lower ends 21b of the strut tower reinforcing members 21. Both ends of the suspension cross member 25 are connected to lower ends of the structures with closed hollow cross sections 41A.

In the same way as in the first embodiment, the strut tower bar 30 is provided between the strut towers 15. Two parts on each end of the strut tower bar 30 are respectively connected to a part on the upper side frame 5, where the strut tower reinforcing member 41 is connected, and to the upper parts of the strut tower 15.

According to the second embodiment, the structure with the closed hollow cross section 41A formed outside the strut tower 15 increase the rigidity even when the space in the strut tower 41 is limited. The structure 41A is especially effective to easily obtain large rigidity especially when a space between a strut and the strut tower 15 is limited.

According to the second embodiment, the lower ends 41b of the strut tower reinforcing members 41 and the ends of the suspension cross member 25 are connected with each other via the front side frames 8. However, it is possible to further increase the connection rigidity of the strut towers 15 with the suspension cross member 25 by directly connecting the lower ends of the strut tower reinforcing members 41 and the ends of the suspension cross member 25 with each other.

As a modification of the above-mentioned first embodiment, it is also possible to provide a strut tower reinforcing member 21 at a rear part of the strut tower 15 so as to form a structure with a closed cross section which extends approximately in a vertical direction by cooperation of the strut tower reinforcing member 21, the upper wall 16 and the rear wall 19 of the strut tower 15. Moreover, it is possible to provide the strut tower reinforcing member 21 on both the front part and the rear part of the strut tower 15. In this case, structures with closed cross sections are formed in front of and behind the strut towers 15.

As a modification of the above-mentioned second embodiment, it is possible to provide a strut tower reinforcing member 41 along the rear edge of the strut tower 15 as to form a closed cross section which extends approximately in a vertical direction by cooperation of the strut tower reinforcing member 41 and the rear wheel apron 13. In the same way as in the modification of the first embodiment, it is possible to provide structures with closed cross sections in front of and behind the strut towers 15, which extend approximately in the vertical direction.

Furthermore, it is also possible to manufacture the strut tower reinforcing members 21 and 41 as separate upper and lower parts depending on requirements relating to the shape and processing characteristics.

According to the front structure of the vehicle according to the present invention, the rigidity of the strut tower is improved by the vertically extending structure with a closed cross section made along the strut tower in cooperation with the strut tower and the strut tower reinforcing member, or of the wheel apron and the strut tower reinforcing member. By positioning the suspension cross member so as to correspond with the rigid structure having the closed cross section in a lengthwise direction of the vehicle, the upper side frame, the strut tower and the suspension cross member are rigidly connected to each other. As a result, the rigidity of the entire vehicle body can be increased.

By using the front structure of the present invention, it is possible to avoid the use of additional reinforcing members or the application of stiffening operation. Consequently, the front structure of the present invention has an excellent rigidity of light weight without accompanying the weight increase of the vehicle or the complicated structure.

Moreover, by providing the strut tower bar between the left and right strut towers, the left and rigid structures with the closed cross sections which extends approximately in a vertical direction from the upper side frames to the front side frames, the suspension cross member and the strut tower bar are connected to each other and the ring shape connection is firmly made. Thus, the rigidity of the front structure of the vehicle is improved.

Other structures and functions that may be disclosed in Japanese Patent Application 2002-272014, filed on Sep. 18, 2002 are hereby incorporated by reference into this application.

The present invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

What is claimed is:

1. A front structure of a vehicle comprising:
    a pair of symmetrically formed units, each including:
        an upper side frame extending in a lengthwise direction of the vehicle;
        a front side frame extending in a lengthwise direction of the vehicle at a lower and inner position with respect to said upper side frame;
        a wheel apron extending in a lengthwise direction of the vehicle to provide a lateral wall of an engine compartment of the vehicle, an upper end and a lower end of said wheel apron being respectively connected to said upper side frame and said front side frame;
        a strut tower provided between said upper side frame and said front side frame and connected to said wheel apron; and
        a strut tower reinforcing member connecting said upper side frame and said front side frame, said strut tower reinforcing member forming a structure having a closed hollow cross section extending approximately in a vertical direction in cooperation with said strut tower; and
    a suspension cross member extending in a widthwise direction of the vehicle, said suspension cross member connecting said front side frame in each of said units to each other, said suspension cross member positioned in a lengthwise direction of the vehicle corresponding to a lower end of said structure having a closed hollow cross section in each of said units.

2. The front structure of the vehicle as claimed in claim 1, wherein:
    a lateral end of said strut tower is connected to a lateral end of said strut tower reinforcing member and to a lateral end of said wheel apron.

3. The front structure of the vehicle as claimed in claim 1, wherein:

a lower edge of said strut tower reinforcing member is connected to said suspension cross member.

4. The front structure of the vehicle as claimed in claim 2, wherein:

a lower edge of said strut tower reinforcing member is connected to said suspension cross member.

5. The front structure of the vehicle as claimed in claim 1, further comprising:

a strut tower bar for connecting said strut tower in each of said units to each other.

6. The front structure of the vehicle as claimed in claim 2, further comprising:

a strut tower bar for connecting said strut tower in each of said units to each other.

7. The front structure of the vehicle as claimed in claim 3, further comprising:

a strut tower bar for connecting said strut tower in each of said units to each other.

8. The front structure of the vehicle as claimed in claim 5, wherein:

said strut tower bar is connected to said strut tower and to said upper side frame at a location with respect to a lengthwise direction of the vehicle corresponding to said structure having a closed hollow cross section.

9. The front structure of the vehicle as claimed in claim 1, further comprising:

a strut tower bar for connecting said strut tower in each of said units to each other, each free end of said strut tower bar having a first installation part and a second installation part, said first installation part being connected to said upper side frame, said second installation part being connected to an upper face of said strut tower, said strut tower bar positioned in a lengthwise direction of the vehicle corresponding to a closed hollow cross section.

* * * * *